T. N. ROACH.
PLUMB LEVEL.
APPLICATION FILED DEC. 9, 1907.
904,014.
Patented Nov. 17, 1908.
Fig. 1
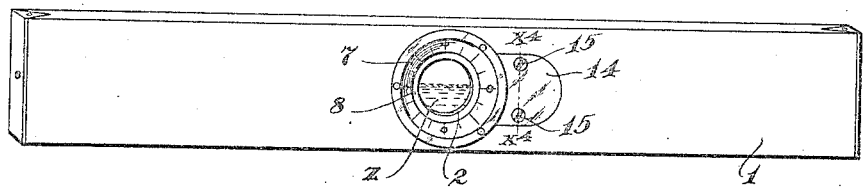
Fig. 3
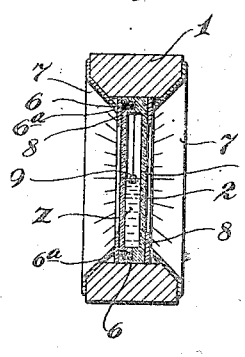
Fig. 2
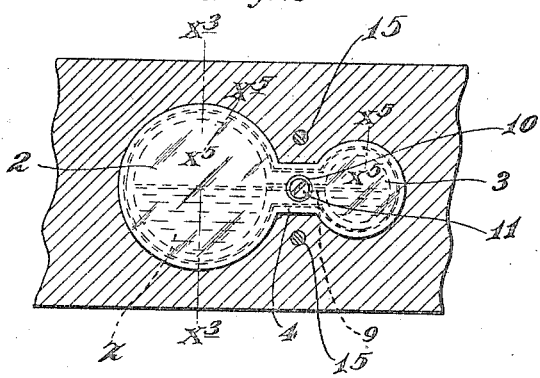
Fig. 5
Fig. 4
Fig. 6
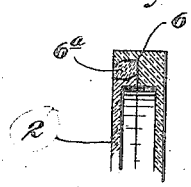
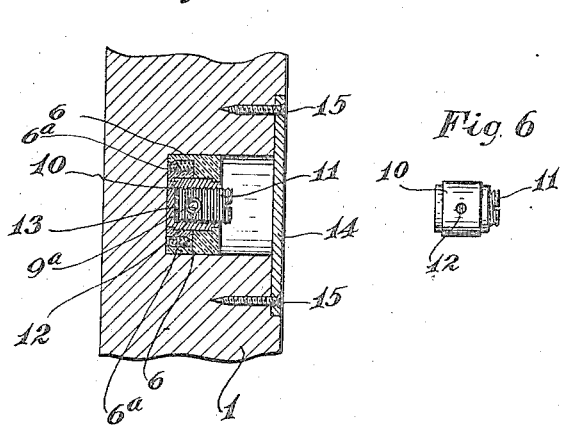
Witnesses:
L. L. Simpson.
A. H. Opsahl.
Inventor:
Thomas N. Roach,
By his Attorneys:
Williamson & Merchant

UNITED STATES PATENT OFFICE.

THOMAS N. ROACH, OF MINNEAPOLIS, MINNESOTA.

PLUMB-LEVEL.

No. 904,014.

Specification of Letters Patent.

Patented Nov. 17, 1908.

Application filed December 9, 1907. Serial No. 405,648.

*To all whom it may concern:*

Be it known that I, THOMAS N. ROACH, a citizen of the United States, residing at Minneapolis, in the county of Hennepin and State of Minnesota, have invented certain new and useful Improvements in Plumb-Levels; and I do hereby declare the following to be a full, clear, and exact description of the invention, such as will enable others skilled in the art to which it appertains to make and use the same.

My invention relates to plumb-levels, and is in the nature of an improvement on the level disclosed and claimed in my prior patent 602,874 of date April 26, 1898. In my said prior patent, a thin cylindrical or circular chamber was half filled with a suitable liquid, such as alcohol; one side at least of this chamber is provided with a transparent wall exposed to view; and a graduated scale of annular form was located around or concentric with the said chamber. This previous device, while highly satisfactory in most respects, nevertheless had this defect that under expansion and contraction of the liquid and of the containing chamber or reservoir, the upper surface of the liquid would not always extend on a line that would truly intersect the axis of the reservoir.

The principal feature of my present invention is directed to the elimination of the above noted defect. This I accomplish by the provision of an auxiliary chamber or reservoir, which has communication with the main chamber or reservoir of the level through a small passage. This makes it possible to run more or less of the liquid from the auxiliary reservoir into the main reservoir, or vice versa, so that for any temperature an amount of liquid just sufficient to half fill the main chamber may be introduced into the latter. To cut off communication from the main reservoir to the auxiliary reservoir or chamber, and vice versa, a valve is placed in the communicating passage between the two chambers.

Generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a perspective view of my improved level. Fig. 2 is a vertical longitudinal section taken through the central portion of the body of the level, and showing the improved main and auxiliary chambers applied therein. Fig. 3 is a transverse vertical section taken on the line $x^3$ $x^3$ of Fig. 2. Fig. 4 is an enlarged section taken on the line $x^4$ $x^4$ of Fig. 1. Fig. 5 is an enlarged section taken on either of the two lines $x^5$ $x^5$ of Fig. 2, some parts being broken away; and Fig. 6 is a plan view showing in detail the valve which controls the passage between the main and auxiliary chambers or reservoirs.

The body or stock 1 of the level is of the usual rectangular form and, at its central or intermediate portion, is recessed to receive and closely fit the main liquid reservoir or chamber 2 and the connected supplemental reservoir or chamber 3, which parts are constructed of glass or other transparent material and are connected by a neck portion 4. The body made up of said parts 2, 3, and 4 is split or divided by a marginal joint 6 that is hermetically sealed by cement $6^a$. The joint 6 is an interlocking joint and, in cross section, is preferably constructed substantially as in my prior patent, and in Fig. 5 of this application.

On lines concentric with and on opposite sides of the main liquid chamber or reservoir 2 the level body 1 is cut away so that the liquid $z$ contained within the reservoir 2 is directly visible at both sides of the level. Suitably secured to the opposite sides of the level body 1 and located in seats on the opposite sides of the main reservoir 2, are graduated conical dials 7 which, as shown, hold light metal retaining rings 8 against the marginal portions of the said reservoir 2. The dials 7 are graduated to indicate degrees, and zero marks are preferably placed 90 degrees apart and in such disposition that when the level body or stock 1 is in a truly horizontal position the upper surface of the liquid $z$ will register with two of said zero marks; and when the said level body is in a truly vertical position the upper surface of the liquid $z$ will register with the other two zero marks.

The so-called auxiliary reservoir or chamber 3 is connected to the main reservoir 2 through a restricted passage 9 formed in the neck portion 4. Seated in the two sections of the neck portion 4, as best shown in Fig. 4, is a metallic bushing 10 in which works a threaded plug valve 11 having a diametrically extended port 12. The port 12 is adapted to be turned into and out of registration with ports 9ª in the bushing 10. The ports 9ª register with and constitute part of the above noted passage 9, which passage may be opened and closed, at will, by a slight rotation or oscillatory movement of the threaded valve 11. Preferably a pliable packing 13 of leather, rubber or similar material is compressed between the inner end of the valve 11 and the closed end of the bushing 10, for the purpose of frictionally holding the said valve in any set position. The recess in which the screw valve 11 is exposed is normally closed by a plate 14 shown as countersunk into the side of and secured to the level body 1 by screws 15.

With the above described arrangement of main and auxiliary reservoirs or chambers for the liquid, it is possible, at any time, quickly to adjust the level of the liquid in the main chamber or reservoir so that it will extend on a line that truly intersects the axis of the said main reservoir or chamber. More particularly stated, if, due to a change in the temperature, the level of the liquid in the main reservoir is found to be above the axis thereof, the valve 11 may be opened and a portion of the liquid allowed to run from the main reservoir into the auxiliary reservoir so as to effect the proper adjustment or graduation, and then the said valve 11 should be again closed. If, on the other hand, at any time the liquid in the main reservoir should fall to a level below the axis of said reservoir, the valve 11 may be opened and the required amount of liquid permitted to run from the auxiliary reservoir into the main reservoir.

What I claim is:

1. In a plumb level, a stock or body, a transparent cylindrical main liquid-containing reservoir mounted in said stock, an auxiliary reservoir also mounted in said stock, having communication with said main reservoir through a restricted passage, and a valve arranged to open and close the said communicating passage between said two reservoirs, substantially as described.

2. A plumb level comprising a stock with a transverse opening through its sides, a transparent cylindrical main liquid containing reservoir seated in said opening of said stock, an auxiliary reservoir having communication with said main reservoir a graduated dial extended circumferentially of said main reservoir, and a valve for opening and closing the communicating passage between said two reservoirs, substantially as described.

3. A plumb level comprising a stock with a central transverse opening through its sides, a transparent cylindrical main liquid containing reservoir seated in said opening, a graduated dial extended circumferentially of said main reservoir, an auxiliary reservoir having communication with said main reservoir, an oscillatory valve arranged to open and close the communicating passage between said two reservoirs, and a detachable plate applied to said stock and normally concealing said valve, substantially as described.

4. In a plumb level, the combination with a stock, having a transverse recess at an intermediate portion, of a cylindrical main reservoir, an auxiliary reservoir and connecting neck formed by two glass or transparent sections cemented together and adapted to contain a liquid, substantially as described.

5. In a plumb level, the combination with a stock having a transverse opening at its central portion, of a transparent cylindrical main reservoir seated in said transverse opening, an auxiliary reservoir and neck portion, formed by two glass sections cemented together, a metal bushing set into said neck portion and constituting part of the conduit between the two reservoirs, and a diametrically perforated screw-threaded valve working in said bushing, substantially as described.

In testimony whereof I affix my signature in presence of two witnesses.

THOMAS N. ROACH.

Witnesses:
H. D. KILGORE,
F. D. MERCHANT.